United States Patent
Weinstein et al.

(10) Patent No.: US 6,445,519 B1
(45) Date of Patent: Sep. 3, 2002

(54) BASLINE INSTABILITY DETECTOR

(75) Inventors: Robert Edward Weinstein, Louisville; John Charles Harig, III, Broomfield; Michael Dominic Schaff, Longmont, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/473,545

(22) Filed: Dec. 28, 1999

Related U.S. Application Data

(60) Provisional application No. 60/130,294, filed on Apr. 21, 1999, and provisional application No. 60/130,309, filed on Apr. 21, 1999.

(51) Int. Cl.[7] .............................. G11B 5/02; G11B 5/09
(52) U.S. Cl. .......................................... 360/25; 360/46
(58) Field of Search ............................ 360/25, 31, 67, 360/53, 46

(56) References Cited

U.S. PATENT DOCUMENTS

| | | |
|---|---|---|
| 4,075,671 A | 2/1978 | Cheatham et al. ............. 360/66 |
| 4,122,505 A | 10/1978 | Kuijk .......................... 360/66 |
| 5,612,833 A | 3/1997 | Yarmchuk et al. ............. 360/75 |
| 5,625,508 A | 4/1997 | Brown et al. ............. 360/77.02 |
| 5,659,436 A | 8/1997 | Yarmchuk et al. ............. 360/75 |
| 5,751,510 A | 5/1998 | Smith et al. ................... 360/67 |
| 5,777,815 A | 7/1998 | Kasiraj et al. ................ 360/75 |
| 5,812,560 A * | 9/1998 | Yuki .......................... 714/719 |
| 5,818,656 A | 10/1998 | Klaassen et al. .............. 360/67 |
| 5,943,177 A | 8/1999 | Mathews et al. ............. 360/65 |
| 6,091,560 A * | 7/2000 | Du .............................. 360/53 |

\* cited by examiner

*Primary Examiner*—Regina N. Holder
(74) *Attorney, Agent, or Firm*—Merchant & Gould P.C.

(57) ABSTRACT

The method and apparatus herein identifies baseline instability events occurring within a magneto-resistive head. The method commences by capturing a signal average amplitude of a signal emanating from the head. The signal average amplitude is used to set a threshold, the transcendence of which indicates a baseline instability event. Finally, each baseline instability event is counted. The apparatus includes an envelope detector, which captures the signal average amplitude. A comparator unit, operably connected to the envelope detector, uses a threshold based upon the signal average amplitude, and sets a flag whenever the head signal exceeds the threshold. Finally, a counter unit increments its count total each time the flag is set. The counting unit may employ timing control, meaning that it will only increment its total if the flag is set when a clock signal triggers the counter unit to test the flag to decide whether or not to increment.

18 Claims, 4 Drawing Sheets

BASLINE INSTABILITY DETECTOR

RELATED APPLICATIONS

This application claims the benefit of the filing date of U.S. Provisional Patent Application Ser. No. 60/130,294 filed Apr. 21, 1999 and entitled "BASELINE INSTABILITY DETECTOR."

This application also claims the benefit of the filing date of U.S. Provisional Patent Application Serial No. 60/130, 309 filed Apr. 21, 1999 and entitled "PULSE BY PULSE BASELINE INSTABILITY DETECTOR."

FIELD OF THE INVENTION

This application relates to hard disc drives and more particularly to an apparatus and method for detecting, during the course of disc drive manufacture, a head possessing the undesirable characteristic of baseline instability.

BACKGROUND OF THE INVENTION

In a disc drive, the recorded data is detected by a read/write head when the field of a recorded signal is brought in close proximity to the head. An inductive head detects a change in magnetic flux and generates a current. Detection circuitry responds to the induced current, identifying it as indicative of stored data. Alternatively, when a magneto-resistive head reads a magnetic field, it alters its own resistance. The detection circuitry detects the change in head resistance by continually running a current through the head, and identifying changes in voltage across the head. Regardless of how detection is to be accomplished, it is essential that the head's response to encountering a localized magnetic field of a recorded signal be predictable and repeatable. Variance in head response would frustrate the detection circuitry's ability to recognize data and result in errors during read operations.

Magneto-resistive heads possess a particular failure mechanism that is inconsistent with the goal of consistent response to magnetic field immersion. A magneto-resistive head is composed of a film, which changes its own resistance in the presence of a magnetic field. The resistance of such a head is determined by the magnetic polarity of the film. Occasionally, a magneto-resistive head will suddenly change its resistance-flux profile. This failure mechanism is the result of a given region within the magneto-resistive head suddenly re-orienting its magnetic moment in a direction differing from the orientation previously prevailing. The characteristic result of this failure mechanism is two-fold: the voltage peak resulting from the head having encountered a magnetic field is elevated, as is the baseline voltage across the head (the baseline voltage is the voltage across the head in the absence of any magnetic field). Accordingly, this failure mechanism is typically observed during a read operation. A magneto-resistive head exhibiting this failure mechanism is said to possess baseline instability, and produces errors during the reading process.

This phenomenon of baseline instability may also be observed after a write operation. During a write operation, the inductive portion (writing portion) of a magneto-resistive head generates a magnetic field, which is to be retained locally on the recording media. The magnetic field generated during a write operation is strong enough to cause the reading portion of the magneto-resistive head to alter its resistance in a subsequent read mode, thereby producing the aforementioned characteristic effects of baseline instability in susceptible heads.

SUMMARY OF THE INVENTION

The method and apparatus in accordance with the present invention solves the aforementioned problem and other problems by defining a threshold based upon the signal average amplitude of a signal emanating from a target magneto-resistive head, and counting the number of times which the signal emanating from the magneto-resistive head transcends the threshold. The method commences by capturing a signal average amplitude of a signal emanating from a magneto-resistive head which is being tested. The signal average amplitude is used to set a threshold, the transcendence of which is indicative of a baseline instability event. Finally, each baseline instability event is counted.

This method allows a population of magneto-resistive heads to be screened, so that heads possessing the instability failure mechanism can be excluded from the manufacture of drives. This method is also useful in characterizing the manufacturing process that is producing the heads.

The apparatus includes an envelope detector, which is used to capture the signal average amplitude of a signal emanating from a target magneto-resistive head. A comparator unit is operably connected to the envelope detector. The comparator unit uses a threshold based upon the signal average amplitude, and sets a flag in the event that the signal emanating from the magneto-resistive head exceeds the threshold. Finally, a counter unit is operably connected to the comparator unit. The counter unit increments its count total each time the flag indicator or mark is set. The counting unit may employ some form of timing control, meaning that the counting unit will only increment its count total if the flag is set at the same time a clock signal triggers the counter unit to test the flag for the purpose of deciding whether or not to increment.

These and various other features as well as advantages of the present invention will be apparent from a reading of the following detailed description and a review of the associated drawings.

DETAILED DESCRIPTION

Figure 1:
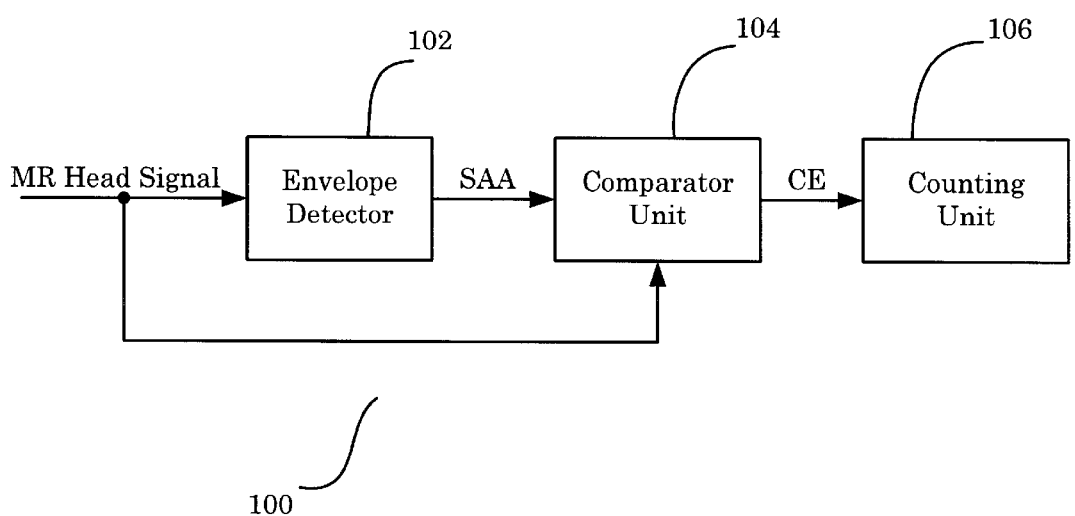
FIG. 1 depicts a baseline instability detector in accordance with a preferred embodiment of the invention.

FIG. 1 depicts a baseline instability detector 100 in accordance with a preferred embodiment of the invention. The baseline instability detector 100 is intended to be used as part of the manufacturing process of disc drives, serving as a piece of test equipment, the purpose of which is to identify occurrences of baseline instability events in magneto-resistive heads intended for use in disc drives. Identification of baseline instability events has numerous uses. For instance, this information could be used to screen magneto-resistive heads intended for inclusion within a disc drive, ensuring that only heads less prone to baseline instability error are used. Additionally, this information could be used to gather information about the manufacturing process of the magneto-resistive heads themselves, by feeding the information to a system employing statistical process control techniques. Additional uses for the baseline instability detector 100 are likely, and it may be used in any circumstance in which it is desirable to identify occurrences of baseline instability events.

During testing, the target magneto-resistive head is stimulated by a magnetic field signal similar to that it would encounter while reading data from a disc within a disc drive. The source of this stimulation can vary. For instance, the magnetic field may originate from a disc similar to one which would be assembled into the finished drive. Alternatively, the magnetic field could originate from an electromagnet (if the magnetic head were to be tested at an earlier stage of manufacture). Finally, the baseline instability detector may even be used with no magnetic field at all for stimulating the magnetic head. Prior to stimulating the target magneto-resistive head during testing, a write operation may optionally be conducted. The purpose of the write operation is to attempt to induce the target magneto-resistive head into a noisy state, for detection during testing.

The baseline instability detector 100 possesses an envelope detector 102 which receives the signal resulting from the target magneto-resistive head being stimulated by magnetic fields. The envelope detector 102 is a lossy integrator, designed with a time constant sufficient to determine the signal average amplitude (measured in volts) of the signal emanating from the target magneto-resistive head. Although referred to as the "signal average amplitude" throughout this document, this quantity is more specifically termed the "track average amplitude" when the magnetic fields stimulating the target magneto-resistive head originate from a disc.

The comparator unit 104 receives the signal average amplitude from the envelope detector 102 and uses it to produce a threshold against which it compares the signal emanating from the target magneto-resistive head. The comparator unit 104 asserts a count enable signal if the signal emanating from the target magneto-resistive head exceeds the threshold.

Finally, counting unit 106 receives the count enable signal, and the counting unit 106 increments a value representing the number of occurrences of baseline instability events, each time the count enable signal is asserted.

Figure 2:
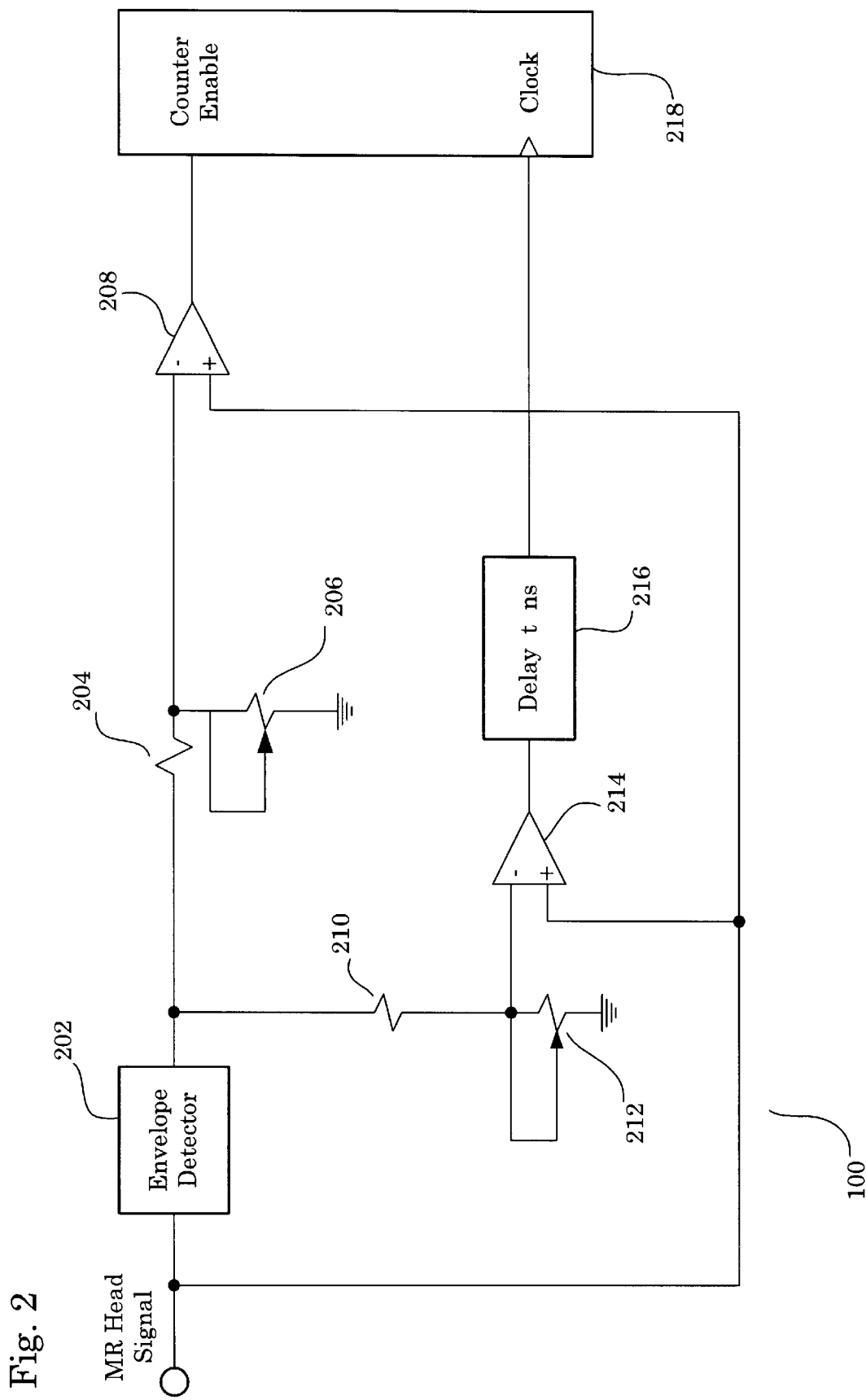
FIG. 2 depicts one preferred embodiment of the baseline instability detector of FIG. 1.

FIG. 2 depicts one preferred embodiment of the baseline instability 100 detector of FIG. 1. An envelope detector 202 receives the signal resulting from the target magneto-resistive head detecting magnetic fields. The envelope detector 202 is a lossy integrator, designed to have the voltage it accumulates decay over an interval of time appropriate to determine the signal average amplitude (measured in volts) of the signal emanating from the target magneto-resistive head.

The comparator unit is composed of resistors 204, 206 and a comparator 208. The resistors 204, 206 cooperate to form a voltage divider, effectively dividing the signal average amplitude by a divisor predetermined by the value of their respective resistances. The voltage resulting from dividing the signal average amplitude in the voltage divider 204, 206 is used as a threshold for comparator 208. Comparator 208 compares the signal emanating from the target magneto-resistive head to the threshold. The values of the resistors 204, 206 are chosen so as to result in a voltage threshold which the baseline voltage should not exceed. The threshold should be chosen, by varying the resistance of variable resistor 206, to detect the greatest number of actual baseline instability events, while not erroneously detecting non-events. If the signal emanating from the magneto-resistive head exceeds the threshold, the comparator 208 generates a count enable signal.

The counting unit is composed of resistors 210, 212, a comparator 214, a delay channel 216, and a counter 218. The resistors 210, 212 cooperate to form a second voltage divider, dividing the signal average amplitude by a divisor determined by the value of their respective resistances. The voltage resulting from dividing the signal average amplitude in the voltage divider 210, 212 is used as a threshold, the crossing of which indicates that a data pulse is beginning. When the signal emanating from the target magneto-resistive head exceeds the threshold, the comparator 214 provides an output. The comparator output is propagated across a delay channel 216, the delay period of which is chosen to be equal to the time between the leading edge of a data pulse and the point in time at which the data pulse would ordinarily expire, returning to a baseline voltage. The delay period is used to ensure that comparator 218 tests the count enable signal only when the voltage emanating from the target magneto-resistive head should have returned to baseline. Finally, the comparator output reaches counter 218, and is used as a clock signal, driving the counter. The counter 218 will increment its count total if and only if the clock signal triggers the counter 218 while count enable signal is asserted.

If the baseline instability detector is intended to examine head response to both positive and negative-going magnetic fields, the embodiment of FIG. 2 would need to be modified to include a duplicate of every element except the counter 218, with the inputs on each duplicate of the comparators 208, 212 being reversed.

Figure 3:
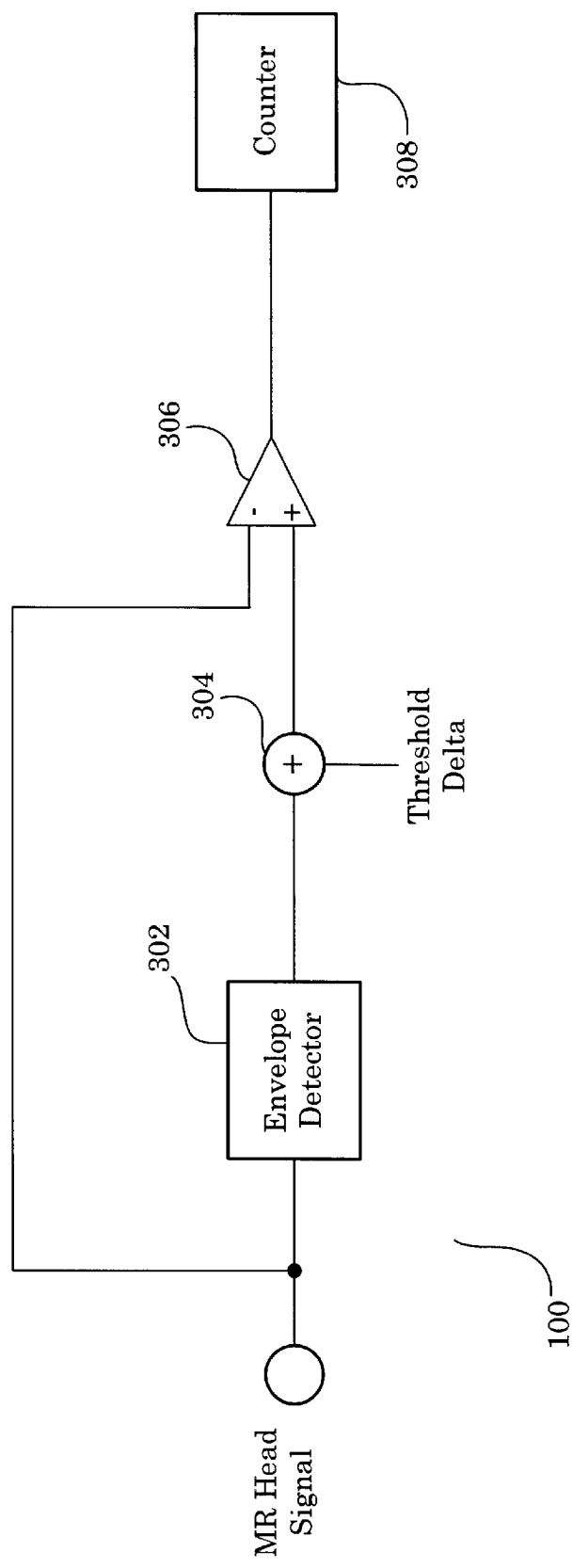
FIG. 3 depicts an alternate preferred embodiment of the baseline instability detector of FIG. 1.

FIG. 3 depicts an alternate preferred embodiment of the baseline instability detector 100 of FIG. 1. The baseline instability detector 100 possesses an envelope detector 302 which receives the signal resulting from the target magneto-resistive head being stimulated by magnetic fields. The envelope detector 302 is a lossy integrator, designed with a time constant sufficient to determine the signal average amplitude (measured in volts) of the signal emanating from the target magneto-resistive head.

The comparator unit is composed of an adder 304 and a comparator 306. The adder receives the signal average amplitude and adds to it a predetermined incremental quantity, yielding a threshold above which the signal emanating from the target magneto-resistive head will pass only in the occurrence of a baseline instability event. The incremental quantity is determined so as to ensure that small variations in signal average amplitude do not falsely trigger the counter, but not so high as to allow genuine baseline instability events to avoid detection. The comparator 306 asserts its output (a count enable signal) when the signal emanating from the target magneto-resistive head exceeds the threshold. The counting unit consists of a counter 308 that increments its count total whenever the count enable signal is asserted.

If the baseline instability detector is intended to examine head response to both positive and negative-going magnetic fields, the embodiment of FIG. 3 would need to be modified to include a duplicate of every element except the counter 308, with the inputs on the duplicate of comparator 306 being reversed, and the incremental quantity being supplied to the duplicate of adder 304 being negated.

If the baseline instability detector 100 is intended to operate with no magnetic field at all stimulating the target magneto-resistive head, the condition to be detected is a departure from the expected quiescent state of the head. Accordingly, it is important to note that the embodiment of FIG. 3, when operating in this manner, would use its envelope detector 302 during a preliminary stage in which the target magneto-resistive head was stimulated for the purpose of allowing a signal average amplitude to be determined. Thereafter, the baseline instability detector 100 would be operated as normal, but with no magnetic stimulus provided to the target magneto-resistive head. A predetermined incremental quantity, calculated based upon the signal average amplitude determined in the preliminary stage and being chosen so as to optimally detect noisy heads, would be supplied to the adder 304. Note that during operation, the envelope detector 302 would yield no output.

The embodiments of FIGS. 1, 2, and 3 may be constructed from a microprocessor and digital-to-analog converter, rather than discrete components. By sampling the signal emanating from the target magneto-resistive head and feeding the sampled data to a microprocessor, the envelope detector 102, the comparator unit 104, and the counting unit 106 may be realized within the microprocessor's circuitry.

Figure 4:
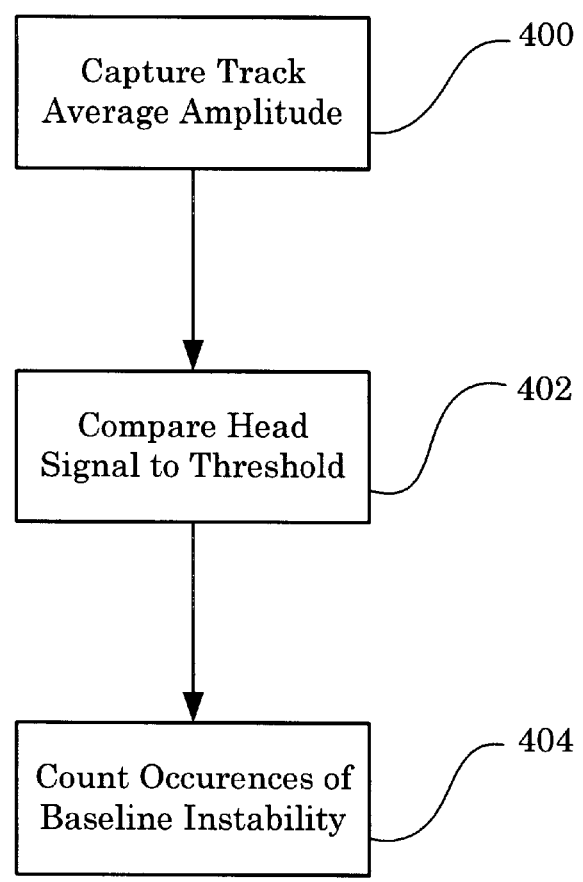
FIG. 4 depicts a method of detecting baseline instability events.

FIG. 4 depicts a method of detecting baseline instability events. In operation 400, the signal average amplitude is captured. This can be accomplished by continuous lossy integration of the signal emanating from the target magneto-resistive head, or by discrete lossy integration of sampled data from the head. In either event, it is necessary to integrate with a time constant sufficient to allow a track average to be determined.

In comparator operation 402, the signal emanating from the target magneto-resistive head is compared against a threshold determined from the signal average amplitude captured in operation 400. The threshold can be determined in several ways. For example, baseline instability events can be identified by examining the voltage at the peak of a data pulse; the threshold can be computed by adding a predetermined incremental value to the signal average amplitude. Alternatively, baseline instability events can be identified by examining the baseline voltage level following a data pulse; the threshold could be computed by dividing the signal average amplitude by a predetermined divisor. Still yet, baseline instability events can be identified, by examining the signal emanating from the target magneto-resistive head to determine if it contains unexpected noise components when the head is tested with no magnetic stimulation; the threshold would be computed as a fraction of the signal average amplitude. Irrespective of the method of computing the threshold, comparator operation 402 must set some form of a flag indicating that the signal emanating from the target magneto-resistive head exceeded the threshold.

Finally, in count operation 404, a count total is incremented each time the flag referred to in operation 402 is set. If it was desired to identify baseline instability events by examining the baseline voltage level following a data pulse, the count total would be incremented if and only if the flag was set concurrent with a given amount of time having elapsed since the leading edge of a data pulse.

To summarize the present invention, an apparatus for detecting baseline instability in a magneto-resistive head for a disc drive consists of the following. An envelope detector (such as 102) captures a signal average amplitude from the signal emanating from the target magneto-resistive head.

A comparator unit (such as 104) compares a signal emanating from the magneto-resistive head with a threshold determined based upon the signal average amplitude. The comparator unit may consist of an adder (such as 304) for computing a threshold by adding a predetermined value to the signal average amplitude, and a comparator (such as 306) for comparing the signal emanating from the target magneto-resistive head with the threshold. Alternatively, the comparator unit (such as 104) may consist of a division module (such as 204, 206) that computes a threshold by dividing the signal average amplitude by a given divisor, and a comparator (such as 208) for comparing the signal emanating from the target magneto-resistive head with the threshold.

Finally, a counting unit (such as 106) counts the occurrences of baseline instability events. The counting unit (such as 106) may consist of a counter (such as 308), which increments its count total whenever the output of the comparator unit is asserted. Alternatively, the counting unit may consist of a counter (such as 218) that increments its count total only when both the output of the comparator unit is asserted and a timing signal indicates that incrementing is appropriate.

A method of detecting baseline instability events consists of the following steps. First, the signal average amplitude is captured (such as in operation 400). Next, the signal emanating from the target magneto-resistive head is compared against a threshold determined from the signal average amplitude (such as in operation 402). The threshold can be determined in several ways. For example, if it was desired to identify baseline instability events by examining the voltage at the peak of a data pulse, the threshold can be computed by adding a predetermined incremental value to the signal average amplitude. Alternatively, if it was desired to identify baseline instability events by examining the baseline voltage level following a data pulse, the threshold could be computed by dividing the signal average amplitude by a predetermined divisor. Irrespective of the method of computing the threshold, comparator operation 402 must set some form of flag indicating that the signal emanating from the target magneto-resistive head exceeded the threshold. Finally, a count total is incremented each time the flag referred to in operation 402 is set (such as in operation 404). If it was desired to identify baseline instability events by examining the baseline voltage level following a data pulse, the count total would be incremented if and only if the flag was set concurrent with a given amount of time having elapsed since the leading edge of a data pulse.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An apparatus for detecting baseline instability in a magneto-resistive head for a disc drive, comprising:

an envelope detector receiving a signal emanating from the magneto-resistive head and determining a signal average amplitude;

a comparator unit comparing the signal emanating from the magneto-resistive head with a threshold based upon the signal average amplitude; and a counting unit counting a number of occurrences in which the signal emanating from the magneto-resistive head exceeds the threshold, so that responsiveness of the magneto-resistive head to a magnetic field can be characterized by counting baseline instability events.

2. The apparatus of claim 1 wherein the comparator unit further comprises:

a summer receiving the signal average amplitude, and adding to the signal average amplitude a predetermined value, yielding an adjusted threshold; and a comparator comparing the signal emanating from the magneto-resistive head with the adjusted threshold, and indicating when the signal exceeds the adjusted threshold.

3. The apparatus of claim 2 wherein the counting unit comprises a counter that increments whenever the signal emanating from the magneto-resistive head exceeds the adjusted threshold.

4. The apparatus of claim 1 wherein the comparator unit further comprises:

a threshold module receiving the signal average amplitude and dividing it according to a predetermined ratio, yielding an adjusted threshold; and a comparator comparing the signal emanating from the magneto-resistive head with the adjusted threshold, and indicating when the signal exceeds the adjusted threshold.

5. The apparatus of claim 4 wherein the counting unit comprises a counter that increments only when the signal emanating from the magneto-resistive head exceeds the adjusted threshold, and a timing signal indicates that the voltage emanating from the magneto-resistive head should have returned to baseline.

6. The apparatus according to claim 1 wherein the signal is fed through a delay channel having a delay period representative of a time period between a leading edge of a received data pulse and a time at which the data pulse is expected to return to a baseline value.

7. The apparatus of claim 6 wherein the comparator unit further comprises:

a summer receiving the signal average amplitude, and adding to the signal average amplitude a predetermined value, yielding an adjusted threshold; and a comparator comparing the signal emanating from the magneto-resistive head with the adjusted threshold, and indicating when the signal exceeds the adjusted threshold.

8. The apparatus of claim 7 wherein the counting unit comprises a counter that increments whenever the signal emanating from the magneto-resistive head exceeds the adjusted threshold.

9. The apparatus of claim wherein 6 the comparator unit further comprises:

a threshold module receiving the signal average amplitude and dividing it according to a predetermined ratio, yielding an adjusted threshold; and a comparator comparing the signal emanating from the magneto-resistive head with the adjusted threshold, and indicating when the signal exceeds the adjusted threshold.

10. The apparatus of claim 9 wherein the counting unit comprises a counter that increments only when the signal emanating from the magneto-resistive head exceeds the adjusted threshold, and a timing signal indicates that the voltage emanating from the magneto-resistive head should have returned to baseline.

11. A method for detecting baseline instability in a magneto-resistive head for a disc drive, comprising:

a) receiving a signal emanating from the magneto-resistive head and determining a signal average amplitude;

b) comparing the signal emanating from the magneto-resistive head with a threshold based upon the signal average amplitude; and c) counting the number of occurrences in which the signal emanating from the magneto-resistive head exceeds the threshold, so that the responsiveness of the magneto-resistive head to a magnetic field can be characterized by counting the number of baseline instability events.

12. The method of claim 11 wherein step b) further comprises:

(b)(i) adding a predetermined value to the signal average amplitude, yielding an adjusted threshold; and (b)(ii) comparing the signal emanating from the magneto-resistive head with the adjusted threshold, and indicating when the signal exceeds the adjusted threshold.

13. The method of claim 12 wherein step c) comprises:

(c)(i) incrementing a count value whenever the signal emanating from the magneto-resistive head exceeds the adjusted threshold.

14. The method of claim 11 wherein step b) further comprises:

(b)(i) dividing the signal average amplitude by a predetermined divisor, yielding an adjusted threshold; and (b)(ii) comparing the signal emanating from the magneto-resistive head with the adjusted threshold, and indicating when the signal exceeds the adjusted threshold.

15. The method of claim 14 wherein step c) comprises:

(c)(i) incrementing a count value only when the signal emanating from the magneto-resistive head exceeds the adjusted threshold, and a timing signal indicates that the voltage emanating from the magneto-resistive head should have returned to baseline.

16. An apparatus for detecting baseline instability in a magneto-resistive head for a disc drive, comprising:

a counter for keeping a tally of the number of encountered baseline instability events; and a means for determining when a particular magneto-resistive head has undergone a baseline instability event by comparing a signal emanating from the magneto-resistive head to a threshold based upon a signal average amplitude of the signal emanating from the magneto-resistive head.

17. The apparatus according to claim 16 wherein the signal from the magneto-resistive head is fed through a delay channel having a delay period representative of a time period between a leading edge of a received data pulse and a time at which the data pulse is expected to return to a baseline value.

18. The apparatus according to claim 17 wherein the means for determining further comprises a summer receiving the signal average amplitude, and adding to the signal average amplitude a predetermined value, yielding an adjusted threshold; and a comparator comparing the signal emanating from the magneto-resistive head with the adjusted threshold, and indicating when the signal exceeds the adjusted threshold.

* * * * *

UNITED STATES PATENT AND TRADEMARK OFFICE
CERTIFICATE OF CORRECTION

PATENT NO.   : 6,445,519 B1
DATED        : September 3, 2002
INVENTOR(S)  : Weinstein et al.

It is certified that error appears in the above-identified patent and that said Letters Patent is hereby corrected as shown below:

<u>Title page,</u>
Item [54], delete "BASLINE" and insert -- BASELINE --

Signed and Sealed this

Twenty-fifth Day of March, 2003

JAMES E. ROGAN
*Director of the United States Patent and Trademark Office*